United States Patent [19]

Takano et al.

[11] Patent Number: 4,779,488
[45] Date of Patent: Oct. 25, 1988

[54] POWER TRANSMISSION SYSTEM

[75] Inventors: Hiroshi Takano, Miki; Mu Matsuo, Shizuoka, both of Japan

[73] Assignee: Mitsuboshi Belting Ltd., Kobe, Japan

[21] Appl. No.: 24,688

[22] Filed: Mar. 11, 1987

[30] Foreign Application Priority Data

Mar. 11, 1986 [JP] Japan .................. 61-54000

[51] Int. Cl.$^4$ .................. F16H 9/04; F16H 11/06
[52] U.S. Cl. .................. 74/745; 192/85 AA
[58] Field of Search ............ 74/689, 745; 192/85 AA

[56] References Cited

U.S. PATENT DOCUMENTS

| 2,495,988 | 1/1950 | Sheppard | 192/85 AA |
| 2,804,780 | 9/1957 | Gerst | 192/85 AA X |
| 3,229,551 | 1/1966 | Stuckey | 74/745 |
| 3,442,346 | 5/1969 | Winter et al. | 74/689 X |
| 3,647,037 | 3/1972 | Toma | 192/85 AA X |
| 3,831,762 | 8/1974 | Schulz | 192/85 AA X |
| 4,455,888 | 6/1984 | Wayman et al. | 74/689 |
| 4,529,393 | 7/1985 | Makishima | 74/689 X |
| 4,619,157 | 10/1986 | Sakai | 74/689 |
| 4,660,438 | 4/1987 | Tatara et al. | 74/689 |

FOREIGN PATENT DOCUMENTS

| 652476 | 11/1962 | Canada | 192/85 AA |
| 736521 | 9/1955 | United Kingdom | 74/745 |
| 2063395 | 6/1981 | United Kingdom | 74/745 |

Primary Examiner—Rodney H. Bonck
Attorney, Agent, or Firm—Wood, Dalton, Phillips, Mason & Rowe

[57] ABSTRACT

An adjustable speed transmission according to the present invention comprises a variable speed pulley drive system and a multiple speed gear drive system. The pulley system and gear system are combined with a reversible gear system to provide a speed transmission system which is variable over a wide range of speeds while utilizing a conventional belt type speed pulley system.

13 Claims, 3 Drawing Sheets

POWER TRANSMISSION SYSTEM

FIELD OF THE INVENTION

The present invention relates to a power transmission system, and more specifically, to an adjustable speed transmission for automobiles, construction equipment, agricultural equipment, ships and the like.

BACKGROUND OF THE INVENTION

Automatic transmissions have been utilized for various drive systems, such as in automobiles to allow for ease in driving. The demand for such an automatic transmission has been accordingly increasing from year to year. Conventional automatic transmissions utilize fluid torque converter systems. However, such a system is disadvantageous in many respects such as poor power transmission efficiency and complicated construction which leads to higher production costs. More recently, planetary gear type automatic transmissions have been utilized to eliminate some of the above-noted disadvantages.

In conventional belt type power transmission it has been desirable to obtain a broad speed range by use of a belt transmission system only without requiring the use of any subtransmission consisting of a planetary gear transmission or gear transmission unit. However, the necessary range of engine speed is generally as large as 1000 RPM to 6000 RPM, with a large load torque. In order for a belt to permit a large torque to be produced by an automobile engine, while the engine is running, it is necessary to increase the minimum effective pitch diameter of the V-belt to enable adequate performance.

When an automobile engine is running at high speed, the effective diameter of a speed change belt for the V-belt transmission system is maximized. Therefore, in proportion to the increase of speed range, the maximum effective pitch of the speed change pulley on the drive side must be increased by the amount of transmission ratio with respect to the allowable minimum effective pitch diameter of the belt when the torque on the belt is at its highest. As a result, the circumferential speed of the belts becomes extremely high when the engine speed is very high, and the centrifugal force caused by such a large circumferential speed prevents the belt from transmitting power effectively.

The present invention has been developed to overcome the above-described problems with prior power transmission systems.

SUMMARY OF THE INVENTION

In accordance with the present invention, an adjustable speed transmission is provided which utilizes a speed pulley mechanism and a speed gear mechanism to control speed over a broad range.

Broadly, there is disclosed herein a novel adjustable speed transmission having a variable speed pulley input drive mechanism and a multiple speed gear drive output mechanism. A selectively engageable clutch has an input portion driven by the input drive mechanism and an output portion. A reversible gear means is driven by the clutch output portion for selectively driving the multiple speed gear drive output mechanism either directly from the variable speed pulley input drive mechanism or reversely from the variable speed pulley input drive mechanism.

The input drive mechanism includes a driver pulley and a driven pulley and belt together comprising an adjustable speed pulley. The input drive mechanism includes a driven output shaft integral with the driver pulley, with the input portion of the clutch being rotatably fixed to the driven output shaft. The output portion of the clutch includes a cylindrical intermediate shaft rotatable concentrically about the driven shaft. A driver portion for the reversible gear means is rotatable with said intermediate cylindrical shaft.

The reversible gear means includes a first gear continuously meshed with the multiple speed gear drive output mechanism, a second gear, and means for causing the second gear to selectively guide the first gear for driving the output mechanism in a first rotational direction or to drive said output mechanism directly for driving the output mechanism in a second rotational direction opposite to the first rotational direction.

The friction clutch has an input side clutch member comprising a cylindrical member having a terraced surface and mounted concentrically on and integrally with the driven shaft, a sliding member forming a pressure chamber inside the cylindrical member and slidably housed in the cylindrical member. An output side clutch member comprises a supporting member having a terraced surface which is mounted opposite to the input side clutch member on the driven shaft through bearings so as to be rotatable and integral with respective shafts in the axial direction. At least one pair of friction disks is disposed adjacently and alternately to each other between the internal surface of the cylindrical member and a side wall of the supporting member.

Further features and advantages of the invention will readily be apparent from the specification and from the drawings.

DESCRIPTION OF THE PREFERRED EMBODIMENT

Figure 1:
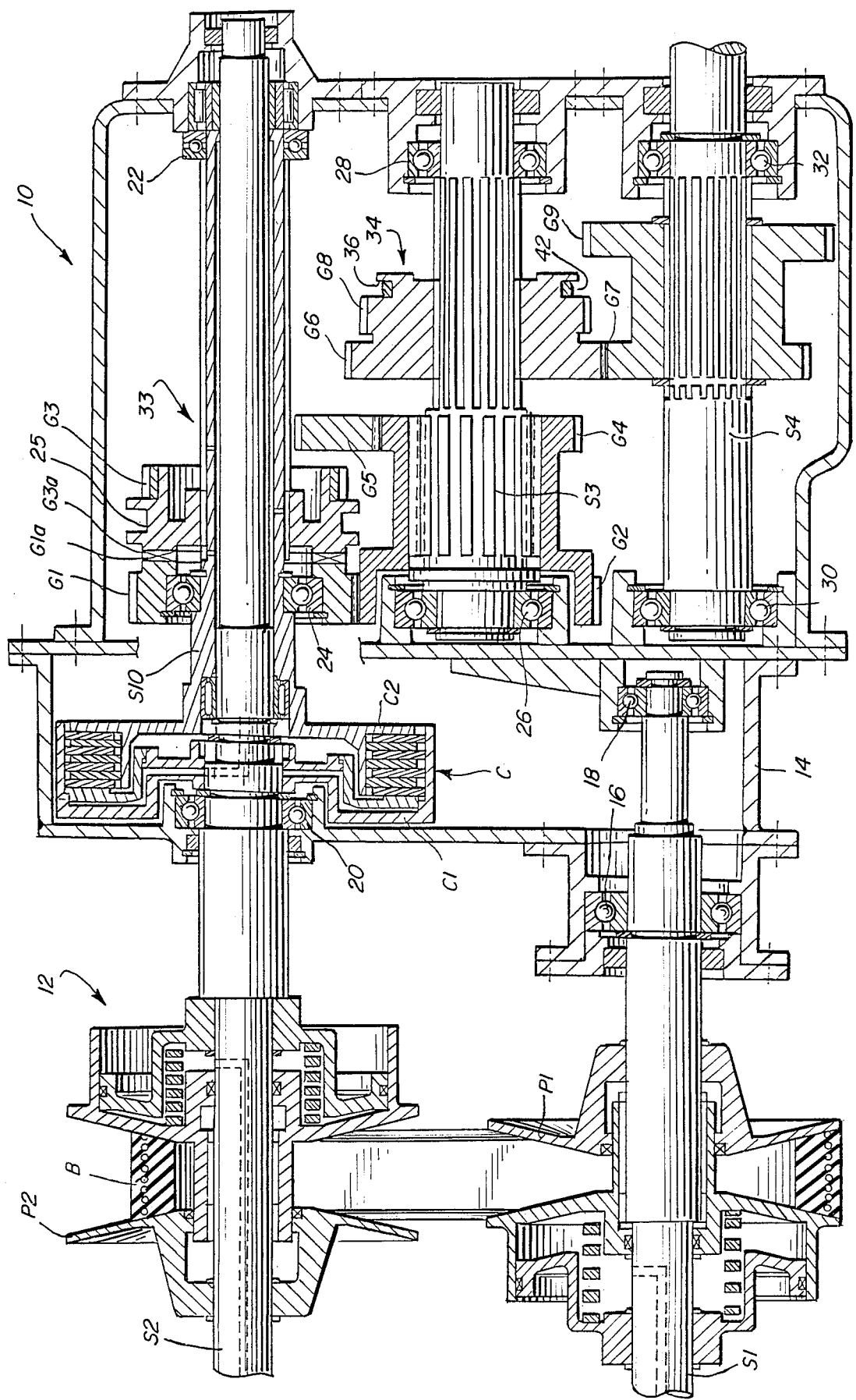
FIG. 1 is a schematic view showing the preferred embodiment of a power transmission system according to the present invention.

Referring to FIG. 1, a power transmission system 10 according to the present invention is illustrated. The power transmission system 10 includes a driver V-belt type speed change pulley P1 integrally mounted with a shaft S1. The shaft S1 extends from the output shaft of an engine of, for example, an automobile. A driven V-belt type speed change pulley P2 is integrally mounted with a driven shaft S2 and is disposed opposite the driver pulley P1. A V-belt B spans between speed change pulleys P1 and P2. The pulleys P1 and P2 and belt B comprise a variable speed pulley input drive mechanism 12.

A gear case 14 is mounted on the shafts S1 and S2, respectively through bearings 16, 18, 20 and 22. The gear case 14 additionally houses a series of gear systems and a friction clutch which will be described below.

A friction clutch C coacts with the driven shaft S2 and includes an input-side clutch member C1 and an output side clutch member C2. The output-side clutch member C2 includes a cylindrical intermediate shaft S10 rotatable concentrically about the driven output shaft S2. The end of the cylindrical shaft S10 is rotatably held by the bearing 22 provided with the gear case 14.

A gear G1 is rotatable with respect to the cylindrical shaft S10 either directly or through a bearing 24. When the gear G1 is connected to the shaft S10 through bearing 24, as described above, a gear G1a is coupled to and disposed coaxially with the gear G1, and is engaged with a gear G3a which is coupled to and disposed coaxially with a gear G3. The gear G3 is engaged with cylindrical shaft S10 by a spline or key, such that gear G3 moves freely in the direction of thrust integrally with shaft S10. This construction enables the power transmission system to be provided with normal/reverse speed output.

Figure 2:
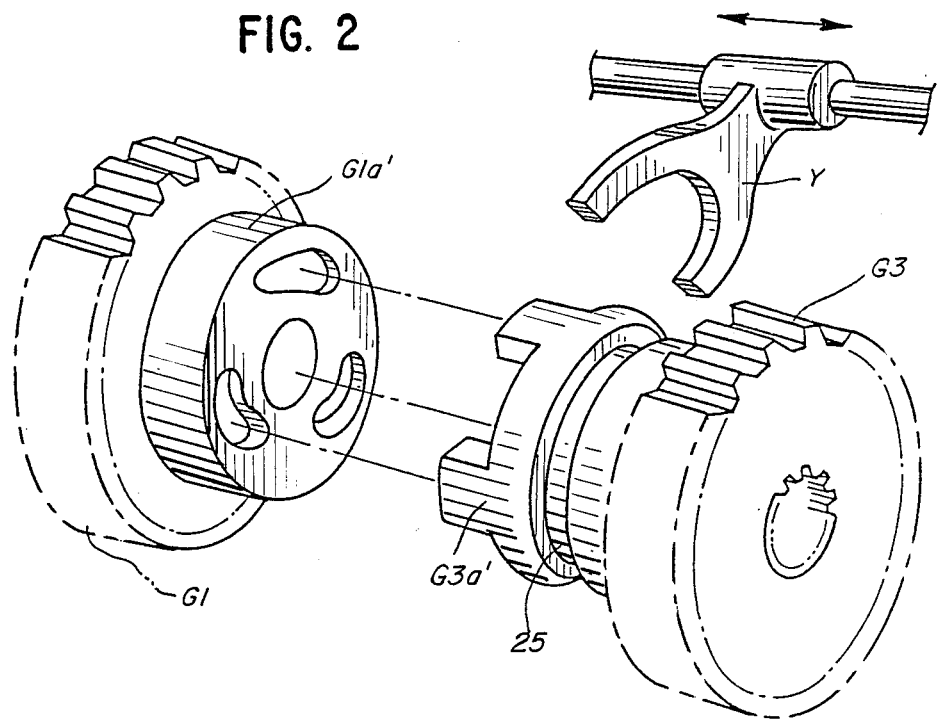
FIG. 2 is an exploded view of a dog clutch forming part of a reversible gear means according to one embodiment of the present invention.

Referring to FIG. 2, gears G1a and G3a may be replaced with a dog clutch consisting of clutch members G1a' and G3a' which are selectively engaged or disengaged with one another according to the axial position of a yoke Y which engages a shoulder 25 in gear G3a' to selectively axially position same.

An intermediate shaft S3 is also provided in the gear case 10. The intermediate shaft S3 is supported by bearings 26 and 28. Additionally, an output shaft S4 is held in the gear case 10 by bearings 30 and 32.

A gear G2 engages with intermediate shaft S3 via a spline. The torque of the cylindrical shaft S10 may be transmitted to the intermediate shaft S3 by the engagement of the gears G1 and G2. A gear G4, coupled to gear G2, is similarly integrally rotatable with respect to the intermediate shaft S3. An idle gear G5 is interposed adjacent and engages the gear G4 so that power can be transmitted from gear G3 to gear G4 when the yoke Y engaging the shoulder 25 of gear G3 axially moves gear G3 so that it engages gear G5. In this latter axial position gears G1 and G3 are disengaged. The gears G1–G5 collectively comprise a reversible gear means 33. Accordingly, if gears G1 and G3 are engaged, then the driven shaft S2 drives the intermediate shaft directly through gears G1 an G2. Alternatively, if the gears G1 and G3 are disengaged, then the driven shaft S2 drives the intermediate shaft reversely through gears G3, G5 and G4, while gear G1 rotates freely.

A pair of gears G6 and G8, differing in the number of gear teeth, are coupled to one another and are mounted on the intermediate shaft S3 via a spline. Gears G6 and G8 can thus move freely in the direction of thrust and rotate with the intermediate shaft S3. Gears G7 and G9 are similarly coupled to one another and are splined on the output shaft S4 and are disposed adjacent to the gears G6 and G8. The gears G6–G9 collectively comprise a multiple speed gear drive output mechanism 34.

The coupled gears G6 and G8 include a shoulder 36 engageable by a yoke Y2 to selectively axially position the gears G6 and G8. Accordingly, there is provided a two-step gear transmission. One gear ratio is produced by the engagement of gear G6 with gear G7 as shown in FIG. 1. The alternate arrangement is produced by the engagement of the gear G8 with the gear G9 as a result of the slidable axial positioning of the gears G6 and G8 toward the right caused by the yoke Y2.

Figure 3:
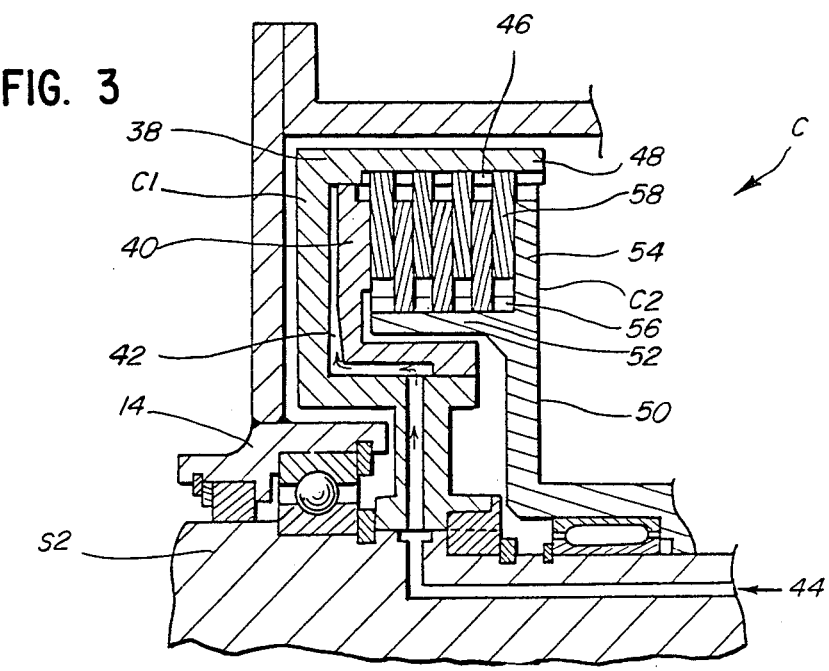
FIG. 3 is a schematic cross-sectional view of a friction clutch according to the present invention.

Referring to FIG. 3 there is shown a multiple disk friction clutch C to be used in conjunction with the power transmission 10 according to the present invention. The input side clutch member C1 comprises a cylindrical member 38 having a terraced surface and mounted concentrically on and integrally with the driven shaft S2. A spline or key groove 46 is provided on the extension 48 of the inner circumferential surface of the cylindrical member 38. A sliding member 40 forms a pressure chamber 42 inside such cylindrical member 38 and is slidably housed in said cylindrical member 38. Oil or air is drawn through a passageway 44 in the driven shaft S2 into the pressure chamber 42.

The output-side clutch member C2 includes a supporting member 50 having a terraced surface that is provided with a cylindrical member 52 and a side-wall member 54. The supporting member 50 is integral with and rotatable with the intermediate cylindrical shaft S10. The output-side clutch member C2 is mounted opposite to the input-side clutch member C1 on the driven shaft S2. A spline or key groove 56 is provided on the outer surface of the output-side cylindrical member 52.

A plurality of sets of friction disks 58 include splines or key grooves to engage with the splines or key groove of the cylindrical members 38 and 52. Thus, the disks 58 are disposed adjacent and alternately from each other between the internal surface of the cylindrical member 38 the sliding member 40 and the outer surface of the cylindrical member 52 and the side wall 54 of the supporting member 50.

If oil or air is forced into the pressure chamber 42 via the passageway 44 then a frictional force is generated between the friction disks 58 to set the clutch "ON", whereby the driven shaft S2 and the intermediate cylindrical shaft S10 of the output-side friction clutch member C2 can be connected to one another. In the absence of such oil or air pressure, the clutch is set to "OFF" and the driven shaft S2 and the intermediate cylindrical shaft S10 are disengaged.

The friction disks described above are multiple disk-type clutches consisting of a plural number of sets of friction disks 58, but this may be replaced with a single disk clutch.

Alternatively, the friction clutch C may be replaced with other types of clutches such as fluid coupling clutches, electromagnetic clutches and drive fluid coupling clutches. Preferably, the clutch is of the type which permits a certain degree of slippage in order to absorb the shock caused by the engagement and disengagement of clutch members.

The construction of the speed change pulley, clutch, gears and the like disposed in such a manner as described in this embodiment is the most preferred and typical embodiment of the present invention as most belt transmission systems carry out speed changes utilizing speed change pulleys.

The arrangement of constituent portions of the power transmission other than that described in the above embodiment may be adopted to such cases where the speed change can be carried out quickly while the speed change pulley is rotated by force of inertia.

The arrangement of constituent members according to the present invention is not limited to the aforementioned embodiment. The object of the present invention can be obtained by providing a construction in which a power transmission system according to the present invention comprises at least a pair of belt speed change pulleys, clutches and speed change members by which speed change by more than two steps can be performed and these members are arranged in series so as to be functional and the speed change members, such as gears, for enabling the speed change by stages are disposed at the position of the output side and with respect to the clutch so that speed change members can be easily operated. Modifications of the embodiment of the present invention will be described hereinafter.

(a) A driver V-belt type speed change pulley is disposed in on output shaft of an engine. A driven speed change pulley is disposed at a driven shaft opposite to the driver pulley. The driven shaft is connected to the input shaft of a friction clutch. The output shaft of the clutch is connected to the input shaft of a reversible gear mechanism which has an output shaft connected to the input shaft of a subtransmission system having a two-step gear ratio. An output is obtained from the output shaft of the subtransmission system.

(b) In the arrangement described in the embodiment (a) above, the output shaft of the friction clutch is connected with the input shaft of the subtransmission system having the two-step gear ratio. The output from the subtransmission system is connected to the input shaft of a reversible gear means. An output is obtained from the output shaft of the reversible gear means.

(c) The extension of an output shaft of an engine is connected to the input shaft of a friction clutch. A driver speed change pulley is disposed on the output shaft. A driven speed change pulley is disposed on a driven shaft opposite to the drive side pulley. The driven shaft is connected to the input shaft of a reversible gear means, which has an output shaft connected to the input shaft of a subtransmission system having a two-step transmission gear ratio. An output is obtained from the output shaftto the subtransmission system.

(d) In the arrangement described in the embodiment (c) above, the driven shaft is connected to the input shaft of the subtransmission system having a two-step transmission gear ratio. The output of the two-step transmission gear ratio is connected to the input shaft of a reversible gea means. An output is obtained from the output shaft of the reversible gear means.

With respect to the foregoing embodiments, it is conceivable that, according to the present invention, the constituents of the power transmission system such as a V-belt transmission, clutches and gears which constitute the power transmission system and stages may be contained separately in individual housings instead of being contained in a common housing. Accordingly, the constituent components are connected to each other in series functionally by conventional power transmission means known in the art such as shafts, gears, and belts. However, the distances between such constituent components may be increased considerably, or an intermediate shaft may be used depending on the layout of the automobile, agricultural machine, ship, industrial machine, or other type of device which the power transmission system according to. the present invention is utilized on. Thus, when the above-described arrangement is utilized, the desired power transmission function can be obtained through the combination of the speed change ratio of the V-belt transmission system and the gear transmission system, according to the speed change range of the V-belt transmission system.

Where the reduction ratio of gears for normal/reverse revolution is disregarded, and the variation range of speed change ratio of V-belt transmission system is given as $$R_1 - R_2 \quad R_1 < R_2;$$

the transmission gear ratios of two-step transmission by gear transmission systems are given as $$R_3 \text{ and } R_4 \quad (R_3 < R_4); \text{ and}$$

the values selected for $R_3$ and $R_4$ are $$R_2 R_3 = R_1 R_4 \text{ and}$$

$$\frac{R_3}{R_4} = \frac{R_1}{R_2}$$

the total range of speed change ratio is relatively small, but in the variation range of speed change ratio given below as $$R_1 R_3 - R_2 R_4,$$

there is no discontinuity in the variation of speed change ratio at all. Consequently, a shockless power transmission system is provided which can be free of any shock even when friction clutch C in the aforementioned gear transmission system is set to ON for low speed/high speed switching.

Furthermore, when, instead of aforementioned $$R_2 R_3 = R_1 R_4$$

$$\frac{R_3}{R_4} = \frac{R_1}{R_4}$$

the values which can satisfy $$R_2 R_3 < R_1 R_4$$

$$\frac{R_3}{R_4} = \frac{R_1}{R_2}$$

are selected, a discontinuous speed change, i.e. one wherein there is non-overlapping of the speed ranges, occurs at the time of low speed/high speed switching, but a wide variation range with speed change ratio can be obtained overall.

Consequently, in a typical application, the relationship between $R_3$ and $R_4$ should be determined depending on the use and purpose of the proposed power transmission system. In applying the power transmission system according to the present invention to automobiles, where $$\frac{R_1 R_4}{R_2 R_3} = K$$

is desirable to select $$1 < K < 1.7, \text{ and more preferably}$$

$$1.3 < K < 1.55$$

Applicant has conducted a test using a power transmission system according to the present invention mounted in an automobile. In this test, the aforementioned value of K was varied. The result of this test indicated that where the value of K is less than 1.55 the shock which frequently occurs due to the acceleration at the time of low speed/high speed switching was not evident. Conversely, when the value of K is greater than 1.55 a slight shock may be observed. As long as the value of K remained no greater than 1.7 the shock felt is no larger than in the case of an automobile equipped with a manual type power transmission.

The power transmission system according to the present invention will be considered in the following comparison example where the arrangement of the power output mechanism is arranged as described in modification (a) above and the case where a power transmissions system is designed using only the belt transmission system previously known in the art.

The above comparison is made under the following conditions:

| | |
|---|---|
| Max. torque of engine | 10 kg-m/3600 r.p.m. (Engine) |
| Torque while running at high speed | 8 kg-m/6000 r.p.m. (Engine) |
| Weight of belt | 1.2 kg/m |
| Allowable tensile force of belt | 380 kg/piece (allowable belt width) |
| (a) System according to the present invention | |
| Speed change ratio by belt transmission system | 2.239 |
| Speed change ratio by gear transmission | 1.8 |
| (b) System for comparison | |
| Speed change ratio by belt transmission | 4.03 |

Under the above-mentioned conditions, when allowable tensile force is given as $\sigma$ (kg), belt speed as v (m-sec), load as H (ps), belt weight as W (kg/m), coefficient of dynamic friction of belt as $\mu$, and contact angle of belt engaged with a small pulley as $\theta$ (The weight of belt should be one where the width of belt is largest), $$\sigma = \frac{75H \, e^{\mu\theta}}{V(e^{\mu\theta} - 1)} + \frac{Wv^2}{g}$$

When the values at top speed are substituted for the above equation, the following equation is obtained.

$$\frac{Wv^3}{g} - \sigma v + \frac{75 \, He^{\mu\theta}}{e^{\mu\theta} - 1} = 0$$

where, g represents the acceleration of gravity.

$$\sigma = 380, H = \frac{8 \times 6000}{716} \, 67, W = 1.2,$$

In this case, allowable belt speed can be expressed as v=42 m/sec. Allowable pitch diameter D on the drive side can be expressed as $$D = \frac{60 \times 10v}{6000\pi} = \frac{60 \times 10^3 \times 42}{6000\pi} = 133.7$$

In this case, according to the present invention, the effective pitch diameter of the driver speed change pulley at maximum torque is $$133.7/\sqrt{2.239} = 89.4$$

The speed change ratio in the case where only a belt transmission system is used is $$133.7/\sqrt{4.03} = 66.6$$

The maximum tensile force acting on belt at maximum torque in the system according to the present invention can be expressed as $$\sigma = \frac{75H}{v} \cdot \frac{e^{\mu\theta}}{(e^{\mu\theta} - 1)} + \frac{Wv^2}{g} = 341(\text{kg} f)$$

where, $$v = \frac{\pi \times 89.4 \times 3600}{60 \times 10^3} = 16.85 \text{ m/sec.}$$

In the case of the comparison system, $$\sigma = 431; \text{ and } v = \frac{\pi \times 66.6 \times 3600}{60 \times 10^3} = 12.55 \text{ m/sec.}$$

The system according to the present invention satisfies the requirements for allowable tensile forces for the belt both at maximum torque and at the top speed shown in Table 1. In the case of the conventional belt power transmission system, however, effective pitch diameter becomes too small due to the fact that a large speed change ratio is required. Consequently, the maximum tensile force acting on the belt substantially exceeds its allowable tensile force, and as such, the system for comparison cannot be put into practical use.

More particularly, in the comparison system, when the effective pitch diameter is larger than 66.6 millimeters, the effective pitch diameter at the top speed increases because of the speed change ratio, which causes the increase in the centrifugal force of the belt, which causes a tensile force larger than the allowable tensile force to be applied to the belt. Thus, as countermeasures against such problems, the weight of the belt must be reduced without sacrificing the lateral rigidity of the belt, so that there is a certain limit for the reduction of belt weight. As apparent from the foregoing comparison, with a power transmission system according to the present invention the effective pitch diameter of a driver belt at maximum torque can be made larger, and the effective pitch diameter of the drive-side belt at the high speed can be designed smaller than the conventional systems, so that the size of the system can be designed to be smaller and more durable.

TABLE 1

| Item | Type of system | Present invention | Comparison |
|---|---|---|---|
| At maximum torque | Effective pitch diameter of drive-side V speed change pulley | φ89.4 mm | φ66.6 mm |
| | Maximum tensile force acting on belt | 341 kgf | 431 kgf |
| At top speed | Effective pitch diameter of drive-side V speed change pulley | φ133.7 | φ133.7 |
| | Circumferential speed of belt | 42 m/sec | 42 m/sec |
| | Centrifugal tensile force belt | 216 kgf | 216 kgf |
| | Maximum tensile force acting on belt | 380 kgf | 380 kgf |

According to the power transmission system of the present invention (1) by combining the V-belt transmission system with the gear transmission system, speed change range of the V-belt transmission system can be reduced by an amount that can be compensated by the gear transmission system to the total necessary speed change ratio. The effective maximum diameter of a pulley for a belt engaged with the pulley of the belt which is liited by the allowable maximum circumferential speed of the belt can be increased, whereby the durability of the belt can be increased. The travel distance of the belt at the time of speed change operation can be reduced, thereby improving the response of the belt at the time of speed change. (2) When the V-belt transmission system, the gear transmission system and the clutch are combined, kickdown and kickup functions used in the automatic transmission systems known in the art installed in automobiles can also be provided by the system according to the present invention.

Figure 4:
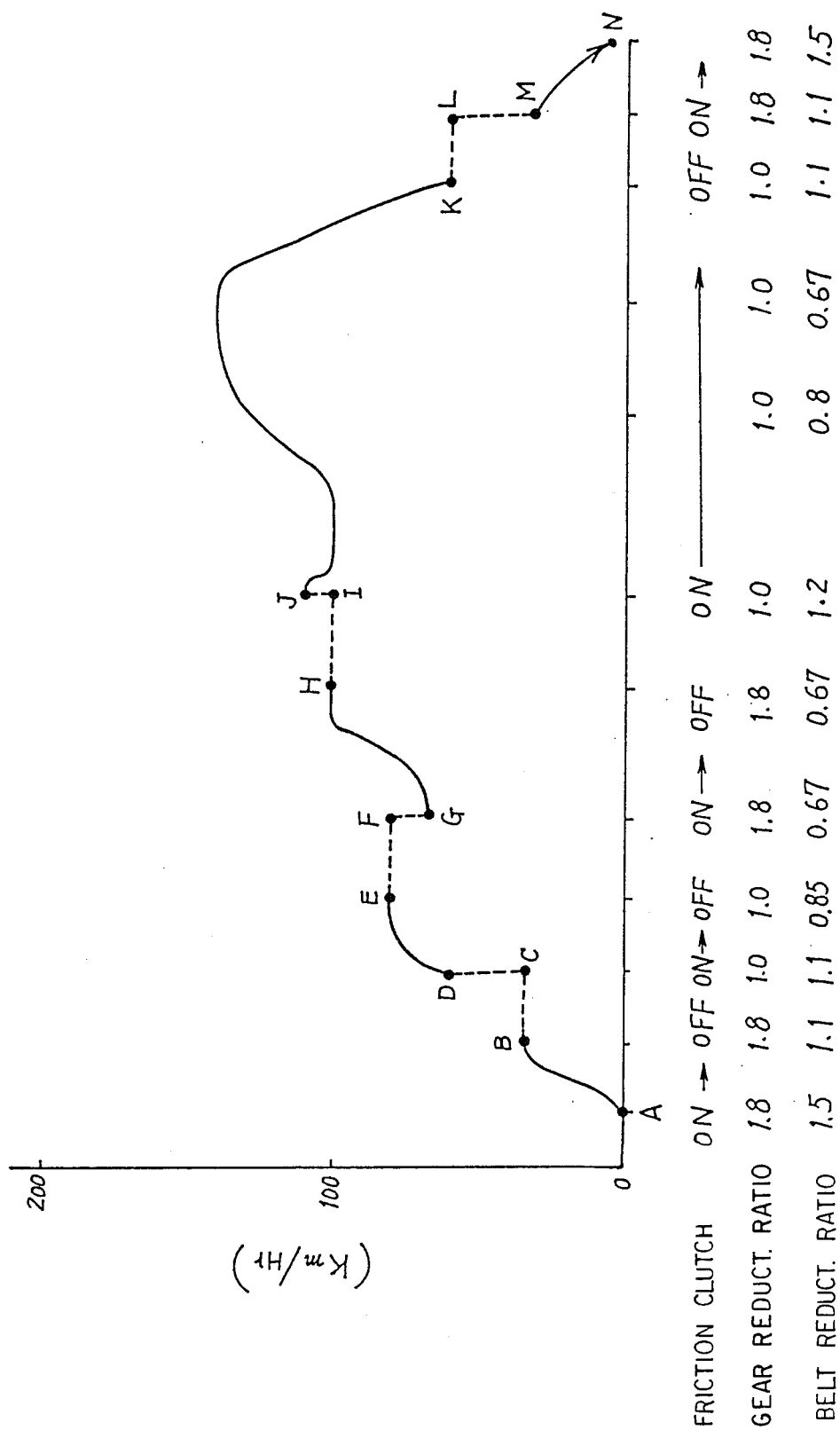
FIG. 4 is a graphical illustration showing the relationship between the speed of an automobile and the speed change ratio of the transmission system according to the present invention.

Referring to FIG. 4 a graphic illustration of the above is shown. More particularly, the curve of FIG. 4 illustrates the relationship between the speed of an automobile in which its wheels are rotated through the output shaft of the transmission system according to the present invention, a propeller shaft and a differential, and the function of the transmission system according to the present invention.

In this example, the speed of the automobile is increased from points A to B when the automobile is accelerated from starting point A with the friction clutch on. The friction clutch is set to off at point B. When the transmission gear system is shifted to the high speed side between points B and C, and the friction clutch is set to on, the kickup effect, corresponding to the increment of transmission gear ratio, can be obtained between points C and D. Thereafter, the automobile accelerates from points D to E and simultaneously the belt transmission is shifted to a higher speed. If rapid acceleration from point E is required, this can be accomplished by what is known as the kickup effect which is provided where the friction clutch is set to off at point E to shift the belt transmission to an even higher speed and the gear transmission is set to the lower speed, and the friction clutch is set to on to increase the speed of the engine. The speed accelerates rapidly from points G to H and the friction clutch is set to off at point H where the rapid acceleration is terminated, and the gear transmission is shifted to the higher speed and the belt transmission is shifted to a lower speed between points H and I. Thereafter, the friction clutch is set to on, and the automobile speed is shifted from the necessary middle-high speed to a lower speed between points J and K. The friction clutch is then set to off at point K. The gear transmission is shifted to the lower speed between points K and L. When the friction clutch is set to on between points L and M, the engine break is functioning. The engine break is utilized from M to N before the automobile is brought to a stop. In such a system, what is called kickdown effect is displayed in the last stage from point L to M.

Thus, the system according to the present invention provides a power transmission system which enables an automatic drive system in which fuel consumption is lower and in a smaller space than is required in a conventional system.

We claim:

1. An adjustable speed transmission comprising:

a variable speed pulley input drive mechanism having a variation range of speed ratio between the values $R_1$ and $R_2$, wherein $R_1$ is less than $R_2$;

a two speed gear drive output mechanism having respective gear ratios represented by the values $R_3$ and $R_4$, wherein the $R_2 R_3 < R_1 R_4$;

a selectively engageable clutch having an input portion driven by said input drive mechanism, and an output portion; and reversible gear means driven by said clutch output portion for selectively driving said multiple speed gear drive output mechanism (a) directly from said variable pulley input drive mechanism wherein output speed from said multiple gear drive output mechanism varies over two non-overlapping speed ranges or (b) reversely therefrom.

2. The adjustable speed transmission of claim 1 wherein said input drive mechanism includes a driver pulley and a driven pulley, each of said pulleys comprising an adjustable speed pulley.

3. The adjustable speed transmission of claim 1 wherein said clutch comprises a friction clutch.

4. The adjustable speed transmission of claim 1 wherein said output portion of the clutch includes an intermediate shaft and said reversible gear means includes a driver portion rotatable with said intermediate shaft.

5. The adjustable speed transmission of claim 1 wherein said output portion of the clutch includes an intermediate shaft and said reversible gear means includes a driver portion axially movably and rotatively fixedly mounted to said intermediate shaft.

6. The adjustable speed transmission of claim 1 wherein said input drive mechanism includes a driven output shaft and said input portion of the clutch is rotatively fixed to said driven output shaft.

7. The adjustable speed transmission of claim 1 wherein said input drive mechanism includes a driven output shaft and said input portion of the clutch is rotatively fixed to said driven output shaft, said output portion of the clutch includes a cylindrical intermediate shaft rotatable concentrically about said driven output shaft, and said reversible gear means includes a driver portion rotatable with said intermediate shaft.

8. The adjustable speed transmission of claim 1 wherein said reversible gear means includes a first gear continuously meshed with the multiple speed gear drive output mechanism, a second gear, and means for causing said second gear to selectively (a) drive said first gear for driving said output mechanism in a first rotational direction, or (b) drive said output mechanism directly for driving said output mechanism in a second rotational direction opposite to said first direction.

9. The adjustable speed transmission of claim 1 wherein said input drive mechanism comprises an infinitely adjustable mechanism.

10. The adjustable speed transmission of claim 1 wherein said input drive mechanism comprises an infinitely adjustable mechanism.

11. The adjustable speed transmission of claim 1 wherein said clutch comprises a friction clutch having an input-side clutch member comprising a cylindrical member having a terraced surface and mounted concentrically on and integrally with a driven shaft, a sliding member housed in said cylindrical member and forming a pressure chamber with the terraced surface, an output-side clutch member comprising a supporting member which is mounted opposite to said input-side clutch member and including an intermediate shaft rotatable concentrically about the drive shaft, and at least one pair of friction disks disposed adjacently and alternately to each other between the cylindrical member and a sidewall of the supporting member and at the outer face of a cylindrical portion of the supporting member.

12. The adjustable speed transmission of claim 1 wherein the values $R_1$, $R_2$, $R_3$, and $R_4$ are selected so that:

$$(R_1 R_4)/(R_2 R_3) = K,$$

And K is selected to be in the range of $1 < K < 1.7$.

13. The adjustable speed transmission of claim 12 wherein the value of K is selected such that $1.3 < K < 1.55$.

* * * * *